United States Patent Office 3,341,482
Patented Sept. 12, 1967

3,341,482
CELLULAR POLYURETHANE COMPOSITION
AND METHOD OF MAKING SAME
George T. Gmitter, Akron, and Edwin M. Maxey, Stow, Ohio, assignors to The General Tire & Rubber Company, Akron, Ohio, a corporation of Ohio
No Drawing. Continuation of application Ser. No. 284,802, June 3, 1963. This application Aug. 1, 1966, Ser. No. 570,136
The portion of the term of the patent subsequent to Oct. 25, 1977, has been disclaimed
9 Claims. (Cl. 260—2.5)

ABSTRACT OF THE DISCLOSURE

A breathable, cellular and resilient polyurethane prepared by repeated high temperature wringing of the reaction product of a polyhydroxyl containing polyether or polyester with an organic polyisocyanate in the presence of a blowing agent, wherein the improvement comprises forming said reaction product in the presence of certain beta-hydroxy substituted, aliphatic, tertiary amines.

This application is a continuation of application S.N. 284,802 filed June 3, 1963, which in turn is a continuation-in-part of application S.N. 626–315 filed Dec. 5, 1956, both now abandoned.

This invention relates to polyester and/or polyether diisocyanate foams and more particularly to the use of catalysts in the production of foams having excellent resiliency.

In the ordinary method of making cellular polyurethane or foamed polyester diisocyanate reaction products, a viscous non-linear liquid polyester is pumped at a controlled rate through a nozzle. An organic polyisocyanate, preferably a diisocyanate having two and only two isocyanate groups, is pumped, but at extremely high pressure, to the nozzle where it contacts the stream of polyester and is thoroughly mixed therewith because of its high velocity. A small amount of water is also introduced into the nozzle either as a stream or in admixture with the polyester. A suitable cross-linking agent, such as 1,3-propylene glycol, and a reaction catalyst, such as certain tertiary alkyl amines, are also generally mixed with the polyester or introduced into the nozzle along with an emulsifying agent in order to obtain good dispersion of the catalysts. A stirrer is also generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold.

Polymerization starts as the materials are mixed and the semi-fluid mass is discharged from the nozzle. The mixing of the material is very important. It is essential that the diisocyanate and catalyst be almost immediately and completely dispersed in the polyester. The rate of polymerization is relatively fast and the mass is shaped by the contour of the pans. Carbon dioxide is evolved in the gaseous state from the time of mixing so that the bubbling and frothing occurs during the mixing, discharging and shaping stages. The resultant foamed product is thereafter heated to cure the product.

Another method of producing polyurethane foam products is to dissolve or disperse an easily liquefied gas such as a Freon in the polyester and using the Freon gas as a means of blowing the polyurethane. This method of producing excellent light-density foams is described in the now abandoned U.S. application, Ser. No. 541,823, of Charles B. Frost, and assigned to the assignee of the present application.

In the past great difficulties have been encountered in the production of cellular polyuurethane materials since the resultant polyurethane lacked some of the desirable properties of sponge rubber, such as resiliency and resistance to humidity aging. Resiliency in sponge or foamed polyurethane materials may be provided in large measure by gas entrapped in closed cells thereof. When the cells walls are ruptured by wringing or passing the sponge between closely spaced rolls or surfaces moving at the same speed, a great decrease in their resiliency usually takes place. The cells must be ruptured to provide the desired breathability and therefore this loss in resilience is a serious limitation to use of polyurethane foam. In the case of polyester-diisocyanate foams, it has been thought impossible to produce a foam with both good resiliency and resistance to humidity aging.

It is important that a reaction catalyst be provided to accelerate the polyester-diisocyanate reaction so that linear growth of the polymer will be fast enough to change the polymer from the liquid state to the gelled state in order to entrap any gas evolved.

Many acidic and basic materials will operate as catalysts and accelerate the primary linear chain growth of the diisocyanate-polyester polymer. Ordinary tertiary amines such as tripropylamine have been used and were found to be effective and very quick acting. The products produced, however, have been lacking in resilience, particularly after wringing of the material to provide open cell structure required for "breathing," which is so desirable in cushion material. The products also have deteriorated badly when aged under conditions of high humidity, particularly at elevated temperatures.

It is an object of the present invention to provide a polyurethane foam with properties of superior resiliency and resistance to humidity aging and which is formed by a process in which the isocyanate-polyester reaction takes place in a reasonable time.

It is a further object to provide a process for producing a polyurethane foam that has good resiiliency even after wringing to break closed cells and flexing.

It is still another object to provide a process for making foam with better resiliency and better resistance to steam aging than those heretofore produced.

We have found that certain amine type catalysts which are characterized by having a free hydroxyl group or oxygen atom in a position beta to an amino nitrogen, when substituted for the ordinary tertiary amine catalysts, greatly influence and enhance the resilience and resistance to humidity of the resultant foam. Apparently catalysts when freely mobile can act reversibly. They act to speed up the reaction during formation of the foam at low humidity and act to depolymerize or destroy the foam upon aging at high humidity. With the catalysts used in accordance with the present invention there is obviously a good chance for immobilization by entry of the free hydroxyl group into the reaction so that the catalyst is no longer free to catalyze the reverse reaction.

The foamed polyurehtanes of the present invention are in general prepared in a normal manner except that the new catalysts are substituted for part or all of the catalyst previously used.

The porous material is prepared by mixing an excess of an organic diisocyanate with a suitable polyester and/or polyether in the presence of a small amount of water to react with isocyanate and produce carbon-dioxide gas, and curing the foam thus produced. The reaction is accelerated in accordance with this invention by a catalyst which comprises at least in part a tertiary amino alcohol catalyst having a free hydroxyl group or oxygen atom attached to a carbon atom in a position beta to the amino nitrogen atom. The cellular foamed reaction product is then cured by heat to render it rubbery and tack-free and preferably wrung or cracked during curing so as to make the cured foam breathable.

The active hydrogen compound used to react with the organic diisocyanate is preferably selected from a member of the group consisting of dihydroxy polyesters and dihydroxy polyethers. Suitable polyesters and polyethers are those described in the previously mentioned application of Charles B. Frost, or U.S. Patent No. 2,577,279 to Simon et al.

The rigidity of the foam is largely controlled by the amount of cross-linking or trifunctional reactants present in the polyester and isocyanate. In general, cross-linking type polyesters or polyethers with substantial amounts of trifunctional materials that promote branching are used for rigid foam urethanes while more linear polyesters or polyethers with molecular weights preferably from about 1500 to 2500 are generally used for producing the flexible polyurethane rubbers. Generally, polyethers are preferred for superior humidity aging resistance and low temperature flexibility, although excellent humidity resistance may be obtained with polyesters when the new catalysts are used as herein set forth. In accordance with the present invention, the molecular weight may be as low as 500 to 600 to obtain some benefits of this invention although the product tends to be more rigid than one produced with a higher molecular weight, and molecular weights as high as 3000 or 4000, or even higher may be used, although the expense of producing polyesters with molecular weights much over 5000 are generally prohibitive. The polyester preferably has a hydroxyl number of about 40 to 80 and no acid number, or an acid number that is low such as less than 10.

All or part of the polyesters used in the examples may be substituted by polyethers. Suitable polyethers for use in obtaining improved polyurethane foams are polyalkylene ether glycols, such as the mixed polyglycol of ethylene-propylene, polytetramethylene glycol, polypropylene glycol, and polyethylene glycol, etc., the latter of which is sold under the name of "Carbowax 1000" and has a molecular weight of about 1000. Polyethers are preferred which have a molecular weight above 700 but those with a molecular weight as low as 500 to 600, or as high as 5000 or even somewhat higher may be used, depending upon the type of improved foamed product desired. Other suitable polyethers besides the aforementioned mixed polyalkylene ether glycols, such as poly (ethylene-propylene) ether glycols, are polytrimethylene ether glycol, polyneopentylene ether glycol, and polypentamethylene ether glycol, and mixtures of these. Best results are obtained with a polypropylene or higher glycol having molecular weight of 2000 to 3000.

The main portion of the polyisocyanate compounds for non-rigid foams are those having two, and only two, active isocyanate groups.

Examples of some of the suitable diisocyanates are:

Tolylene diisocyanate
p,p'-Diisocyanato diphenyl methane
Naphthalene 1,5-diisocyanate
Metaphenylene diisocyanate
Bitolylene diisocyanate
Hexamethylene diisocyanate, and
Durene diisocyanate.

Some triisocyanates may be used in conjunction with one or more of the above when more rigidity is desired or when the polyether or polyester has insufficient trifunctionality to give the desired degree of branching.

A small amount of water is added to provide $CO_2$ gas from its reaction with isocyanate groups in excess of those required for reaction with the polyester or polyether. The formation of the $CO_2$ provides the expansion necessary to form a foam. Preferably the blowing action for the foam is provided by dispersing or dissolving an easily liquefied alkane gas such as dichlorofluoromethane in the polyester which changes from the liquid to gaseous state upon reaching room temperature or below as described in the previously mentioned application of Charles B. Frost.

Certain catalysts are found, as before stated, to make a profound improvement in resilience even after cells have been ruptured by wringing. The catalysts which provide this new result are amino alcohol compounds having at least three carbons in a hydrocarbon group attached to the amino nitrogen, having an oxygen atom beta to the amino nitrogen atom and having the oxygen atom free in order to react with the polymer or polymer forming ingredients. It is important that an oxygen atom be attached to a beta carbon atom in order to obtain excellent resiliency after wringing or rupture of closed cells of the foam or sponge.

One theory of the unusual activity of the catalysts of the present invention is described below and represents a possible explanation of the results. Applicants do not wish to be bound by this theory, however. The principal structural feature common to the amino alcohol catalysts is the position of the oxygen atom beta to the nitrogen atom. It is possible that this structure reacts with the isocyanate giving use to a cyclic intermediate which may lead to its specific reactivity. This is illustarted by the following schematic equations and formulae:

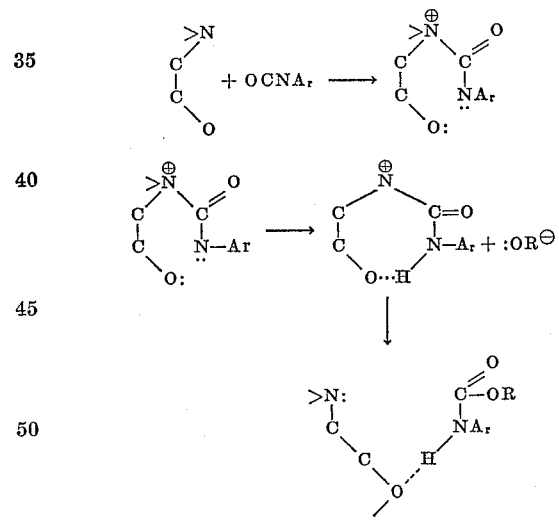

Note:

R is an organic radical representing the polyether or polyester chain.

$A_r$ is an organic radical representing the balance of the isocyanate compound.

The catalysts of the present invention apparently cause a slower reaction between the isocyanate and active hydrogen compound, although generally a predominantly closed cell structure is formed rather than the predominantly open cell structure formed by ordinary catalysts such as tripropylamine. Apparently the amino alcohol catalysts favor the chain extension of the polyester or polyether rather than the cross-linking reaction between linear chains or the formation of gaseous carbon dioxide. The preferred catalysts are dibutyl-aminoethanol and butyl diethanolamine. Suitable catalysts in accordance with the present invention are:

Phenylethylethanolamine
m-Tolyldiethanolamine
2-N-ethylanilineoethanol 1-amino-3-diethylamino-2-propanol
2-di-n-butyl-amino-1-propanol
1-diethylamino-2-propanol
3-dimethylamino-1,2-propanediol
Benzylmethylethanolamine
Dimethyl amino-2-propanol
Diethylaminoethoxyethanol
Ethyl diethanolamine
Isopropyl diethanolamine
Diisopropyl aminoethanol
Tetra hydroxy ethyl ethylene diamine The amino alcohol catalysts are effective in improving resiliency and humidity aging even when amounts as low as 0.05 percent by weight based on 100 parts by weight of the polyester and diisocyanate are used. Amounts as high as 5 parts by weight of the amino alcohol catalyst can be used before decreasing the humidity aging resistance and resiliency properties, although the catalysts are preferably used in the range of 1 to 3 parts for maximum resiliency and resistance to humidity at high temperatures.

As previously stated, the amino alcohol catalysts are slower acting than alkyl amines such as tripropylamine so that mixtures of amino alcohol catalysts and ordinary tertiary amines may be preferred in order to promote chain growth quickly enough to effectively trap the blowing gas to form a light density foam and still impart superior properties of resiliency and humidity aging to the foam.

The hydrocarbon groups attached to the amino nitrogen preferably have at least three carbon atoms in a hydrocarbon group since compounds such as dimethyl amino ethanol and diethyl amino ethanol do not impart maximum benefits of the present invention to resultant foams.

Emulsifiers are preferably used with the amino alcohol catalysts so as to obtain good dispersion to catalyze the reaction and the emulsifiers may be anionic, cationic, or non-ionic in nature. The purpose of the emulsifier is to control the foaming velocity during the formation stage and some of the cationic emulsifier used with the amino alcohols may be an amine having an oxygen atom beta to a tertiary nitrogen atom. These amines, used as emulsifiers, can be expected to provide an increase in resiliency although poorer cell structure may result.

As previously described, the foamed polyurethane is produced by thorough mixing of the polyester or polyether and the diisocyanate. A suitable compound for producing the blowing action, such as water or difluoromonochloromethane, is also mixed in along with a cross-linking catalyst and the amino alcohol catalyst of the present invention. The foamed reaction product is thermoplastic in nature and should be changed to thermosetting in nature by heating the product to cure it and give it the desired rubbery elastic properties. A temperature of around 200° F. to 250° F. or 275° F. is usually used for curing the foam, and curing time is usually 3 to 8 hours at the elevated temperature.

After curing beyond the tacky state, the sponge product is preferably subjected to a wringing or cracking operation such as passing it between tight rolls of a calender mill in order to break bubbly and closed cell structure to make the foam more breathable. A large number of closed cells are produced and wringing is preferred to make a breathable product. We have found that wringing of the foam while at elevated temperature, say of about 150° F. to 300° F., is exceptionally important in eliminating traces of catalysts when one uses catalyst mixtures in which part of the catalysts are free, i.e., do not have a hydroxy group beta to the nitrogen. Several wringings at elevated temperatures, such as curing temperature, are preferred to remove free catalyst from the pores while in a volatile state. The free catalyst, as above stated, is found to cause reversion under high humidity or steam.

The foamed materials of the present invention are preferably formed by first reacting a polyester and/or polyether with a substantial excess of a diisocyanate over a 1:1 molar ratio in the absence of any water so as to form a flowable or viscous dry partially reacted "pre-polymer" so that there are free isocyanate groups present. Subsequently, the dry "pre-polymer" is reacted with water, a cross-linking agent containing a plurality of labile hydrogens, and a tertiary amine catalyst of the present invention. There is a minimum of agitation after the initial dispersion of water in the pre-polymer to prevent the loss of $CO_2$. The amount of water used is generally about 1 to 3 parts by weight to provide $CO_2$ for a low density product based on 100 parts of pre-polymer, although as low as 0.5 part by weight can be used to obtain benefits of this invention. When more than 5 parts are used the urea linkages formed apparently cause a decrease in the resiliency of the foamed product.

EXAMPLE 1

Dichlorodifluoromethane, sold by Du Pont under the name "Freon–12" having a vapor pressure of 84.8 pounds per square inch at 70° F., was dispersed as a liquid in the polyester sold as Desmophen–2200. This polyester is the reaction product of about 1 mol adipic acid, 1 mol diethylene glycol, and about $\frac{1}{30}$ mol of trimethylol propane, which latter provides for branching and cross-linking during the subsequent reaction with diisocyanate. The viscosity of the polyester is held between 1000 and 1100 centipoises at 73° C.; its moisture content is below 2% and preferably is varied between 0.3 and 0.5%, and it has predominantly hydroxyl end groups.

The polyester is mixed with the liquefied gas in an autoclave equipped for agitation for good dispersion and the mixture containing the dispersed liquefied gas is pumped to the aforementioned nozzle of the foam machine after first warming the polyester to about 72° F. A 70:30 mixture of 2,4- and 2,6-tolylene diisocyanate is also pumped at about 1000 pounds pressure through small orifices to the nozzle to react with the polyester to form the polyurethane. The rate of flow through the nozzle is in accordance with the following recipe:

Table I

| Material: | Parts by volume of liquid |
|---|---|
| Polyester | 100 |
| Tolylene Diisocyanate | 39 |
| Activator | 7.05 |
| Dichlorodifluoromethane | 2 |

The activator is composed of:
 (a) A catalyst for the polyurethane reaction consisting of dibutyl amino ethanol _____ 3.0
 (b) An emulsifier used for combining the catalyst with water, consisting of a soap of oleic acid and diethyl amine _____ 2.0
 (c) Sodium dioctyl sulfosuccinate, 10% solution by weight in water _____ 2.95
 (d) Water _____ 2.7
 (e) Silicone master oil solution _____ 0.10

Activator compositions, comprising the emulsifiers and amino alcohol catalysts, are preferably made up in the following order:
 (1) The amino alcohol catalyst;
 (2) The emulsifying agent, such as water solution of Aerosol-Ot (sodium dioctyl sulfosuccinate).

Generally the sodium dioctyl sulfosuccinate solution is best prepared ahead of time since it takes time and considerable agitation for thorough disbursement. A silicone oil master solution for controlling the pore size may also be used. The control of cell size or pore size is substantially maintained by the amount of silicone oil master solution used and is generally decreased if the structure is too open and is generally increased if fissures are encountered.

A silicone oil master solution may be made up as follows:

| Material: | Parts by volume |
|---|---|
| General Electric SF 96 (100) Silicone Fluid [1] | 1 |
| Polyethylene glycol tertiary dioctyl thioether | 5 |
| Water | 244 |
| Total | 250 |

[1] SF Silicone Fluid is an oily dimethyl siloxane.

The results of the test conducted on the resultant foam may be found in Table II below:

Table II

| | Cure | | | |
|---|---|---|---|---|
| | None | 4 hours (not wrung) | 4 hours (then wrung) | 6 hours (wrung) |
| Tensile (pounds square inch) | | 11.2 | 27.8 | 22.7 |
| Elongation | | 155 | 160 | 160 |
| Tear (lbs./in.) | | 1.73 | 1.82 | 2.62 |
| Compression Set (percent) | 71.8 | 31.3 | 13.6 | 9.0 |
| Density (lbs./cu. ft.) | 2.26 | 2.26 | 2.26 | 2.26 |
| Resilience (percent) | 40 | 40 | 39 | 37 |
| 25% Load Deflection, Link Tester, No. precompression (lbs.) | | 32.5 | 24.7 | 26.5 |
| 25% Load Deflection, Link Tester, No precompression, after 3 wringer passes of 85% compression (lbs.) | | 21.8 | 19.1 | 20.5 |
| Percent loss in load deflection after steam aging 5 cycles of 15 min. aging in steam at 15 lbs. pressure and 260° F | −45 | −26 | −25 | −24 |

NOTE.—All cures at 260° F. in forced circulation air oven.

The steam aging was performed on the foamed materials by placing the products in an autoclave at about 250° F. and 15 lbs. steam pressure for 15 minutes. The foamed products were then allowed to dry out over a 24-hour period before being subjected to steam again in the autoclave. The percent loss in load deflection was checked after 5 such cycles, which might represent sterilizing conditions encountered in hospital routines, etc. Steam or humidity aging may be tested in other ways such as by exposure for a predetermined length of time in a humidity cabinet having a temperature of 150 to 180° F. and a relative humidity of 100 percent.

It is noted that the products retain great resiliency even though subjected to wringing. In some cases the values of resiliency were even increased. Excellent resistance to humidity aging is also observed as noted from the low percentage of loss in the load-deflection data for steam aging. When foams are made with identical components as in Example 1 except that ordinary tertiary alkyl amines are used as catalysts, the percent loss on steam aging is 55 percent or even higher.

EXAMPLE 2

Polyurethane foams were prepared by mixing the following formulae with an air stirrer in half-gallon containers:

118 grams (about 98 ml.) polyester
30 grams (about 25 ml.) tolylene diisocyanate
Amine and activator as indicated.

The foamed products were formed by the liberation of $CO_2$ from the reaction of water and isocyanate groups. Results of tests conducted on the foamed products are found in Table III.

Table III

| Amino Alcohol Catalyst | Density of foam (g./cc.) | Amt. (grams) | Activator | Foam Time (Mins.) | Comp. Set (B) | Percent Rebound | | | | 25% Comp. Defl., 10 sq. in. | |
|---|---|---|---|---|---|---|---|---|---|---|---|
| | | | | | | 0W | 5W | 20W | 35W | 0W | After 35W |
| Dimethylamino-2-propanol | 0.08 | 0.5 | C | 3½ | 10.6 | 34 | 36 | 40 | 40 | 25 | 23 |
| | 0.087 | 1.0 | C | 2 | 12.4 | 38 | 35 | 37 | 37 | 43 | 23 |
| | 0.072 | 1.5 | C | 1 | 12.06 | 44 | 34 | 37 | 38 | 19½ | 16½ |
| Diethylaminoethoxyethanol | 0.076 | 0.5 | C | 1½ | | 39 | 37 | 36 | 36 | 23½ | 16½ |
| | 0.065 | 1.0 | C | 1 | | 36 | 34 | 36 | 37 | 22 | 13½ |
| | 0.065 | 1.5 | C | 1 | | 30 | 32 | 32 | 33 | 21½ | 15½ |

NOTES:
Activator C comprises: 1.6 g. water; 1.0 g. Nonic 218 (polyethylene glycol tertiary dioctyl-thioether); 0.1 g. Aerosol OT—100% (sodium dioctylsulfosuccinate); total, 2.7 g.
5W means 5 cycles of wringing, 35W means 35 wrings, etc.
0W means no wrings or original reading before wringing.

EXAMPLE 3

Polyurethane foams were prepared as in Example 2 using the same amounts of polyester and diisocyanate but having the catalyst and solutions somewhat changed as shown. Otherwise the conditions were as in Example 2. The products were tested, the results of which are shown in Table IV.

Table IV

| Amine | Amt. (grams) | Activator | Foam Time (mins.) | Comp. Set (B) | Percent Rebound 0W | 5W | 20W | 35W | 25% Comp. Defl., 10 sq. in. Original | After 35W |
|---|---|---|---|---|---|---|---|---|---|---|
| Butyl diethanolamine | 0.5 | G | 15 | 4.2 | 44 | 44 | 44 | 44 | 43 | 28½ |
|  | 1.0 |  | 24 | 3.5 | 44 | 45 | 43 | 44 | 42 | 26 |
|  | 1.5 |  | 21 | 6.2 | 48 | 49 | 46 | 47 | 48 | 34½ |
| Dibutylaminoethanol | 1.0 | G | 9 | 5.6 | 34 | 44 | 44 | 43 | 30 | 15 |
|  | 1.5 |  | 8 | 10.1 | 37 | 42 | 42 | 42 | 26 | 13 |
| Ethyldiethanolamine | 0.5 | G | 21 | 7.6 | 46 | 46 | 44 | 44 | 37 | 28 |
|  | 1.0 |  | 17 | 6.3 | 44 | 45 | 44 | 44 | 46 | 28 |
|  | 1.5 |  | 12 | 5.9 | 44 | 43 | 42 | 44 | 38 | 24 |
| Isopropyl-diethanolamine | 0.5 | G | 28 | 6.2 | 46 | 44 | 43 | 43 | 51 | 38 |
|  | 1.0 |  | 27 | 5.5 | 48 | 44 | 44 | 44 | 40 | 27½ |
|  | 1.5 |  | 26 | 3.6 | 50 | 44 | 45 | 45 | 44 | 28 |
| Dibutylaminoethanol | 1.0 | L | 10 | 5.6 | 36 | 32 | 36 | 40 | 29 | 18 |
|  | 1.5 |  | 7 | 7.3 | 34 | 34 | 30 | 33 | 24 | 13 |
| Dibutylaminoethanol | 1.0 | R | 10 | 8.1 | 46 | 44 | 44 | 44 | 25 | 13½ |
|  | 1.5 |  | 6 | — | 46 | 41 | 42 | 42 | 29 | 17 |
| o-Tolyl Propanolamine | 0.5 | G | 24 | — | 36 | 46 | 44 | 44 | 36 | 24 |

Activator G:
1.6 g. Water
0.1 g. Aerosol OT–100%
1.5 g. Igepal CO–630
3.2 g.

Activator L:
1.5 g. Emulgator O
0.1 g. Aerosol OT–100%
1.6 g. Water
3.2 g.

Activator R:
1.6 g. Water
1.6 g. Aerosol OT–100%
1.0 g. Emulphor EL–719
2.7 g.

In the above table, "Igepal CO–630" is a nonyl phenoxy polyoxyethylene ethanol sold by General Aniline. "Emulgator O" is an emulsifier used to combine amine catalysts with water. It is a soap of oleic acid and diethyl amine, and is oil-soluble and not miscible with water. "Emulphor ET–719" is a polyoxylated veegtable oil sold by the Antara Division of General Aniline. "Aerosol OT" is sodium di-octyl sulfosuccinate sold by the American Cyanamid Co.

As noted by the percent rebound before and after wringing, the foams of Example 3 exhibit excellent resiliency even after cracking or wringing.

It is to be understood that in accordance with the provisions of the patent statutes, the particular form of product shown and described and the particular procedure set forth are presented for purposes of explanation and illustration and that various modifications of said product and procedure can be made without departing from our invention.

Having thus described our invention, we claim:

1. In the method of making a breathable, cellular and resilient polyurethane wherein polyurethane forming reactants comprising (1) a hydroxy terminated polyol having a molecular weight of from 600 to 5,000 and being at least one polyol selected from the group consisting of a polyalkylene ether polyol and a polyester comprising the reaction product of a polycarboxylic acid and a polyhydric alcohol and (2) an organic polyisocyanate having from 2 to 3 isocyanato groups in which the major amount is an organic diisocyanate, said polyisocyanate being present in a substantial excess over a 1:1 molar ratio of said polyisocyanate to said polyol, are mixed and reacted together in admixture with (3) a blowing agent in an amount sufficient to foam the polyurethane, the improvement comprising additionally mixing with said polyol, polyisocyanate and blowing agent from about 0.05 to 5 parts by weight based on 100 parts by weight of said polyol and said polyisocyanate of a catalytic material for the polyurethane forming reaction, said material comprising an amine consisting of C, H, O and N, having from 4 to 11 carbon atoms, having an oxygen atom on an acyclic aliphatic carbon atom beta to an amino acyclic nitrogen atom, having only acyclic amino nitrogen atoms, being free of —COOH groups and being selected from the group consisting of tertiary aliphatic amino alcohols and tertiary aliphatic-aromatic amino alcohols, and thereafter repeatedly wringing said foam to remove free catalytic material and to break closed cells at a temperature of from about 150 to 300° F.

2. The method of making a breathable, cellular and resilient polyurethane according to claim 1 in which said polyol has a molecular weight of from about 1500 to 3000, said diisocyanate is an aromatic diisocyanate, said amine has an —OH radical on an acyclic aliphatic carbon atom beta to an amino acyclic nitrogen atom, and said blowing agent is a mixture of water and a fluorochloroalkane.

3. In the method of making a breathable, cellular and resilient polyurethane wherein (1) a dry polyurethane prepolymer obtained by mixing and reacting together compounds including (A) a hydroxy terminated polyol having a molecular weight of from 600 to 5000 and being at least one polyol selected from the group consisting of a polyalkylene ether polyol and a polyester comprising the reaction product of a polycarboxylic acid and a polyhydric alcohol and (B) an organic polyisocyanate having from 2 to 3 isocyanate groups in which the major amount is an organic diisocyanate, said polyisocyanate being present in a substantial excess over a 1:1 molar ratio of said polyisocyanate to said polyol, is mixed and reacted with (2) a blowing agent comprising water in an amount sufficient to foam the polyurethane, the improvement comprising additionally mixing with said prepolymer and water from about 0.05 to 5 parts by weight, based on 100 parts by weight of said prepolymer, of a catalytic material for the polyurethane foaming reaction, said material comprising an amine consisting of C, H, O, and N, having from 4 to 11 carbon atoms, having an oxygen atom on an acyclic aliphatic carbon atom beta to an amino acyclic nitrogen atom, having only acyclic amino nitrogen atoms, being free of —COOH groups, and being selected from the group consisting of tertiary aliphatic amino alcohols, and tertiary aliphatic-aromatic amino alcohols, and thereafter repeatedly wringing said foam to remove free catalytic material and at a temperature of from about 150° F. to 300° F.

4. The method of making a breathable, cellular and resilient polyurethane according to claim 3 in which said polyol has a molecular weight of from about 1500 to 3000, said diisocyanate is an aromatic diisocyanate, said water is employed in an amount of from about 0.5 to 5 parts by weight based on 100 parts by weight of said prepolymer, said amine has an —OH radical on an acyclic aliphatic carbon atom beta to an amino acyclic nitrogen atom, and said blowing agent contains additionally a fluorochloroalkane.

5. The method of making a breathable, cellular and resilient polyurethane according to claim 3 in which said polyol has a molecular weight of from about 1500 to 3000, said diisocyanate is an aromatic diisocyanate, said water is used in an amount of from about 0.5 to 5 parts by weight per 100 parts by weight of said prepolymer and said amine has a group of at least 3 carbon atoms attached to an acyclic amino nitrogen atom and has an —OH radical on an acyclic aliphatic carbon atom beta to an amino acyclic nitrogen atom.

6. The method of making a breathable, cellular and resilient polyurethane according to claim 5 where said amino alcohol is dibutyl amino ethanol.

7. The method of making a breathable, cellular and resilient polyurethane according to claim 5 where said amino alcohol is butyl diethanol amine.

8. The method of making a breathable, cellular and resilient polyurethane according to claim 5 where said amino alcohol is diethyl amino-2-propanol.

9. The method of making a breathable, cellular and resilient polyurethane according to claim 5 where said amino alcohol is diisopropyl amino ethanol.

References Cited

UNITED STATES PATENTS

| 2,936,293 | 5/1960 | Orth | 260—2.5 |
| 2,957,832 | 10/1960 | Gmitter et al. | 260—2.5 |

FOREIGN PATENTS 1,106,525  12/1955  France.

DONALD E. CZAJA, *Primary Examiner.*

LEON J. BERCOVITZ, *Examiner.*

C. W. IVY, *Assistant Examiner.*

UNITED STATES PATENT OFFICE
CERTIFICATE OF CORRECTION

Patent No. 3,341,482                                    September 12, 1967

George T. Gmitter et al.

It is hereby certified that error appears in the above numbered patent requiring correction and that the said Letters Patent should read as corrected below.

Column 2, line 6, for "polyuurethane" read -- polyurethane --; line 62, for "polyrehtanes" read -- polyurethanes --; column 4, lines 40 to 44, the left-hand structural formula should appear as shown below instead of as in the patent:

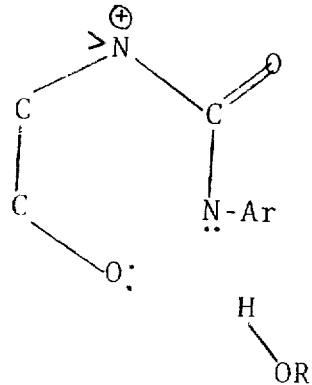

columns 7 and 8, Table III, column 5, line 1 thereof, for "3 1/2" read -- 2 1/2 --; column 9, line 31, for "veegtable" read -- vegetable --.

Signed and sealed this 10th day of September 1968.

(SEAL)
Attest:

EDWARD M. FLETCHER, JR.
Attesting Officer

EDWARD J. BRENNER
Commissioner of Patents